(12) United States Patent
Showalter

(10) Patent No.: US 8,083,636 B2
(45) Date of Patent: Dec. 27, 2011

(54) ELECTRONIC CONTROL TORQUE VECTORING AXLE

(75) Inventor: Dan J. Showalter, Plymouth, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 403 days.

(21) Appl. No.: 11/990,403

(22) PCT Filed: Aug. 16, 2006

(86) PCT No.: PCT/US2006/031924
§ 371 (c)(1),
(2), (4) Date: Feb. 12, 2008

(87) PCT Pub. No.: WO2007/022230
PCT Pub. Date: Feb. 22, 2007

(65) Prior Publication Data
US 2009/0112430 A1 Apr. 30, 2009

Related U.S. Application Data

(60) Provisional application No. 60/708,437, filed on Aug. 16, 2005.

(51) Int. Cl.
*F16H 57/08* (2006.01)
(52) U.S. Cl. ...................... 475/339; 192/84.91
(58) Field of Classification Search ............... 192/84.96, 192/84.91, 113.36; 475/338, 339, 343, 344
See application file for complete search history.

(56) References Cited

U.S. PATENT DOCUMENTS

| | | | |
|---|---|---|---|
| 2,956,657 A * | 10/1960 | Ernst Rudisch Walter | 192/84.91 |
| 4,084,450 A * | 4/1978 | Conroy | 475/160 |
| 4,175,650 A | 11/1979 | Miller | |
| 4,730,514 A * | 3/1988 | Shikata et al. | 475/88 |
| 4,781,078 A | 11/1988 | Blessing et al. | |
| 4,828,091 A | 5/1989 | Gustin | |
| RE33,742 E | 11/1991 | Blessing et al. | |
| 5,176,040 A * | 1/1993 | Kawabe | 74/467 |
| 5,226,503 A * | 7/1993 | Muller | 180/249 |
| 5,370,588 A | 12/1994 | Sawase et al. | |
| 5,566,802 A | 10/1996 | Kirkwood | |
| 5,643,129 A | 7/1997 | Richardson | |

(Continued)

OTHER PUBLICATIONS

SAE Article "Development of a Compact Torque Vectoring Axle for Primary or Secondary Axles" Apr. 2009.

(Continued)

*Primary Examiner* — Justin Holmes
(74) *Attorney, Agent, or Firm* — Warn Partners, P.C.

(57) ABSTRACT

The present invention is an axle (10) for a vehicle having a housing (12), an input shaft (14) coupled to a differential on a first end, extending through the length of the housing (12), and an output gear (16) having a first tooth profile located inside the housing (12) splined to the input shaft (14). Also included is a drive gear (18) having a second tooth profile coupled to a differential housing, at least one planetary gear (20) having a single tooth profile mounted on a carrier (22), in mesh with the first tooth profile of the output gear (16) and the second tooth profile of the drive gear (18), a carrier ring (26), and an actuatable clutch pack (32) coupled to the carrier ring (26) and the housing (12). When the actuatable clutch pack (32) is actuated, the carrier (22) is slowed down, and the speeds of the planetary gear (20) and the output gear (16) are increased, increasing the speed of the input shaft (14).

19 Claims, 8 Drawing Sheets

U.S. PATENT DOCUMENTS

| | | | |
|---|---|---|---|
| 5,884,738 A | 3/1999 | Joslin et al. | |
| 5,890,984 A | 4/1999 | Teraoka et al. | |
| 5,911,291 A | 6/1999 | Suetake et al. | |
| 6,012,560 A | 1/2000 | Kuroda et al. | |
| 6,041,904 A | 3/2000 | Kuroda et al. | |
| 6,056,660 A | 5/2000 | Mimura | |
| 6,098,770 A | 8/2000 | Isley, Jr. | |
| 6,120,407 A | 9/2000 | Mimura | |
| 6,327,935 B1 | 12/2001 | Joslin et al. | |
| 6,349,809 B1 | 2/2002 | Isley, Jr. | |
| 6,378,677 B1 | 4/2002 | Kuroda et al. | |
| 6,427,817 B1 | 8/2002 | Arai et al. | |
| 6,575,282 B2 | 6/2003 | Perlick et al. | |
| 6,672,443 B2 | 1/2004 | Iwazaki et al. | |
| 6,719,662 B2 * | 4/2004 | Forrest et al. | 475/231 |
| 6,761,662 B2 | 7/2004 | Iwazaki et al. | |
| 6,854,571 B2 | 2/2005 | Iwazaki et al. | |
| 6,932,734 B2 | 8/2005 | Hwa et al. | |
| 6,951,522 B2 | 10/2005 | Baxter, Jr. et al. | |
| 7,004,876 B2 | 2/2006 | Puiu | |
| 7,008,345 B2 | 3/2006 | Phelan et al. | |
| 7,014,024 B2 | 3/2006 | Nels et al. | |
| 7,033,300 B2 | 4/2006 | Mueller et al. | |
| 7,044,879 B2 | 5/2006 | Iwazaki et al. | |
| 7,044,880 B2 | 5/2006 | Bowen | |
| 7,081,064 B2 | 7/2006 | Mueller et al. | |
| 7,086,982 B2 | 8/2006 | Bowen | |
| 2005/0032599 A1 | 2/2005 | Gassmann | |
| 2005/0266953 A1 | 12/2005 | Puiu | |
| 2006/0025273 A1 | 2/2006 | Gradu | |
| 2006/0172854 A1 | 8/2006 | Gassmann et al. | |
| 2006/0191768 A1 | 8/2006 | Epple et al. | |

OTHER PUBLICATIONS

"An electromagnetically actuate torque-vectoring axle"; BorgWarner; Vehicle Dynamics Conference Open Attendance; Oct. 2007.

* cited by examiner

ELECTRONIC CONTROL TORQUE VECTORING AXLE

CROSS-REFERENCE TO RELATED APPLICATIONS

This application is a National Stage of International Application No. PCT/US2006/031924, filed Aug. 18, 2006; which claims priority to U.S. Patent Application No. 60/708,437 filed on Aug. 16, 2005. The disclosures of the above applications are incorporated herein by reference.

FIELD OF THE INVENTION

The present invention relates to biasing the axles of rear differential assemblies, and their use in motor vehicles.

BACKGROUND OF THE INVENTION

Differentials are commonly known and are used in various applications for motor vehicles. One of the most common functions for a differential is to allow power to be transferred to a set of wheels while allowing the wheels to rotate at different speeds. This is most useful when a vehicle is performing turning maneuvers. Several advancements have been made to improve the function of differentials to allow power to be transferred to one wheel while the other is slipping, this can occur most often when there are wet or icy conditions while driving. One of these advancements involves the use of a common clutch pack assembly comprised of a series of interleaved separator plates and friction plates.

SUMMARY OF THE INVENTION

The present invention is an electronic control torque vectoring axle for a motor vehicle having a housing, an input shaft for receiving a driving force, coupled to a differential on a first end, having a flange on a second end, extending through the length of the housing, and an output gear having a first tooth profile located inside said housing, splined to the input shaft. The present invention also includes a drive gear having a second tooth profile coupled to a differential housing and at least one planetary gear having a single tooth profile mounted on a carrier. The planetary gear is in mesh with the first tooth profile of the output gear and the second tooth profile of the drive gear. The carrier includes a carrier ring for supporting the carrier, and an actuatable clutch pack coupled to the carrier ring and the housing.

When the actuatable clutch pack is actuated, the carrier ring and the carrier are slowed down, and the speeds of the planetary gear and the output gear are increased, increasing the speed of the input shaft, allowing for the Overdrive Biasing Axle to compensate for changes in direction of the motor vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
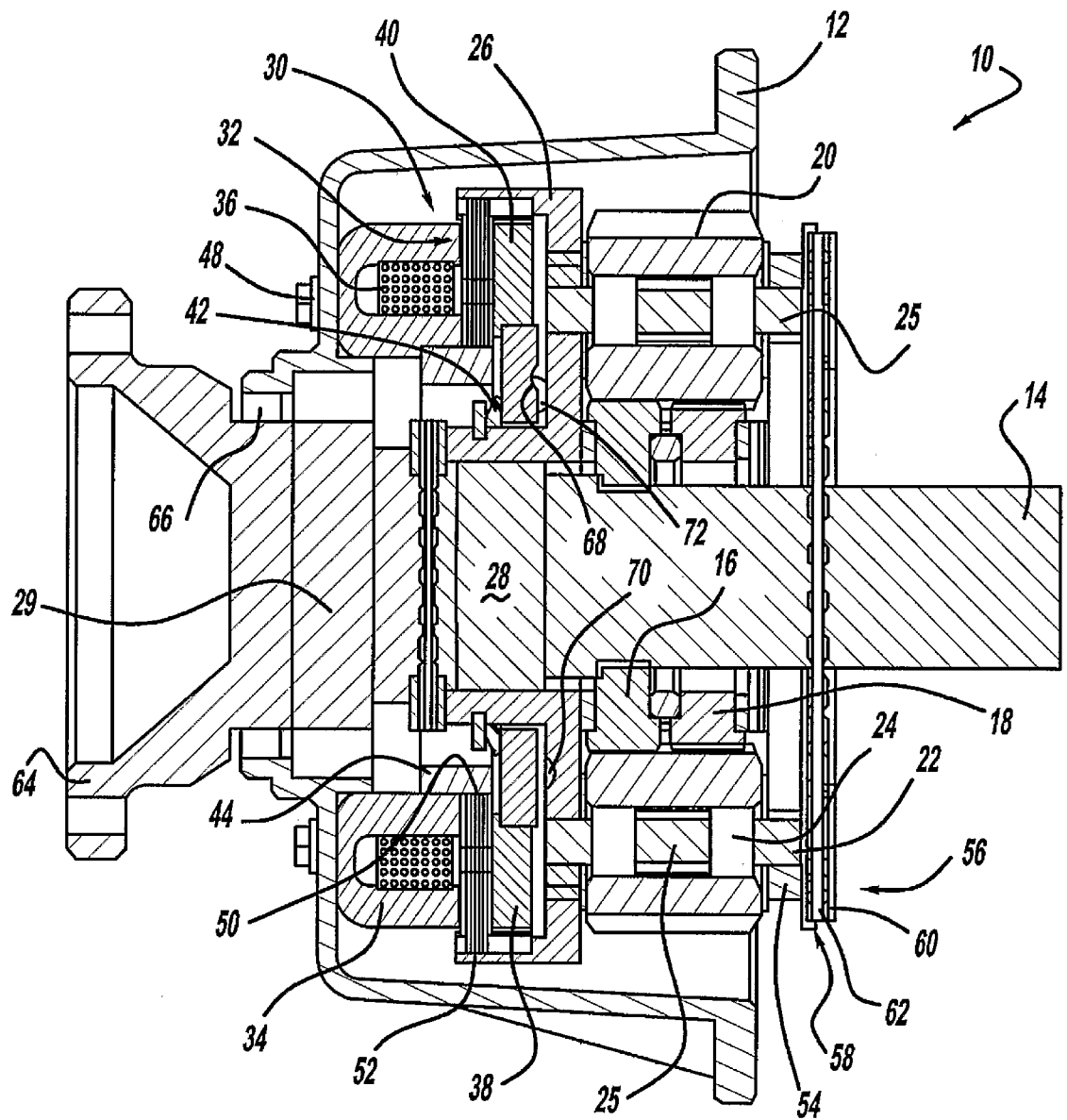
FIG. 1 is a first sectional side view of an electronic control torque vectoring axle, according to the present invention.

An electronic control torque vectoring axle (eTVA) according to the present invention is shown in FIG. 1 at 10. The eTVA 10 has a housing 12 which is securely fastened to one side of a differential (not shown) used in a motor vehicle. The eTVA 10 shown in FIG. 1 can be used on conjunction with another eTVA 10 on the opposite side of a vehicle differential to form a biasing axle where torque and speed delivered to each axle from the differential can be controlled.

Figure 2:
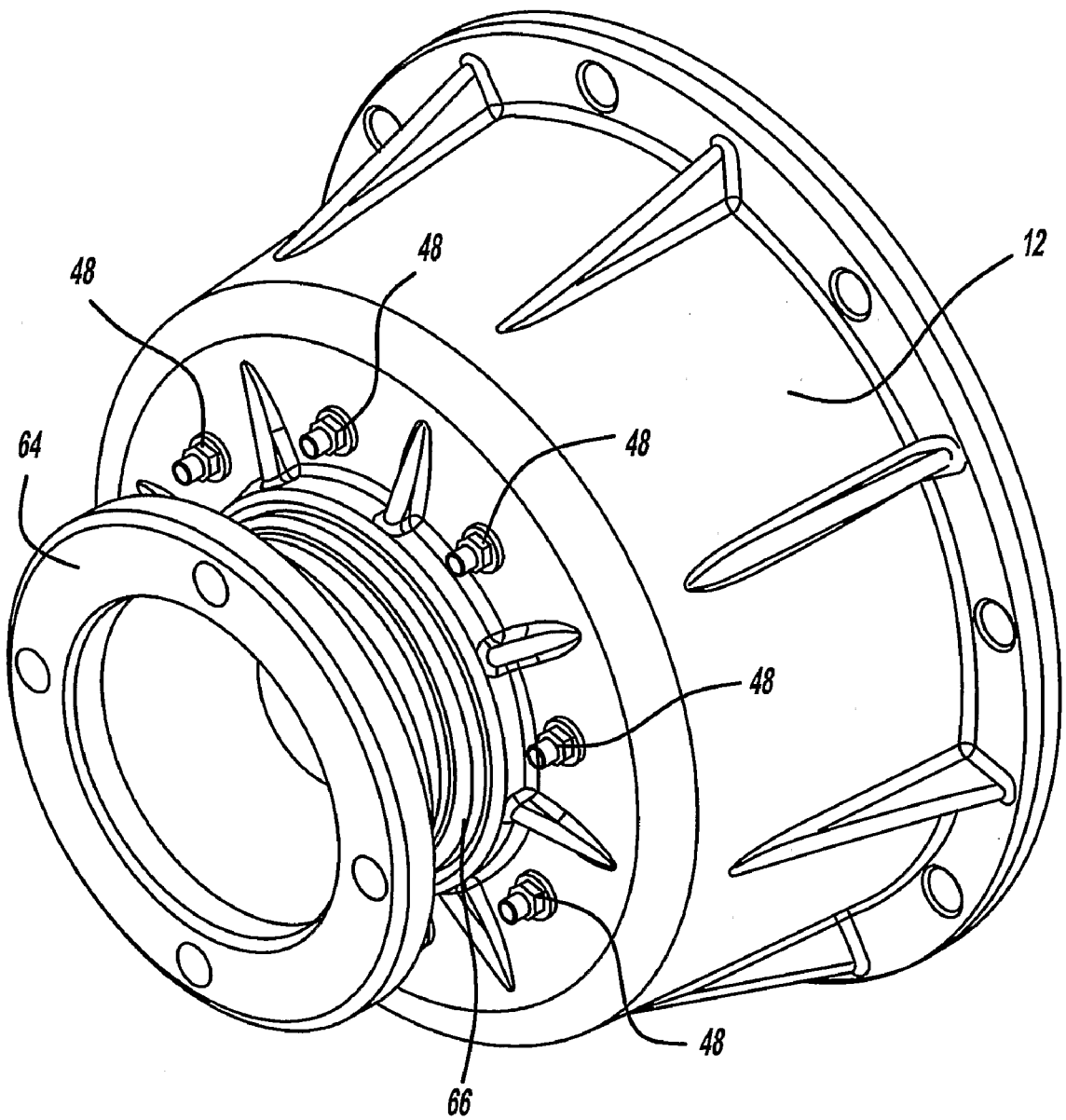
FIG. 2 is an isometric view of the electronic control torque vectoring axle according to the present invention.
Figure 3:
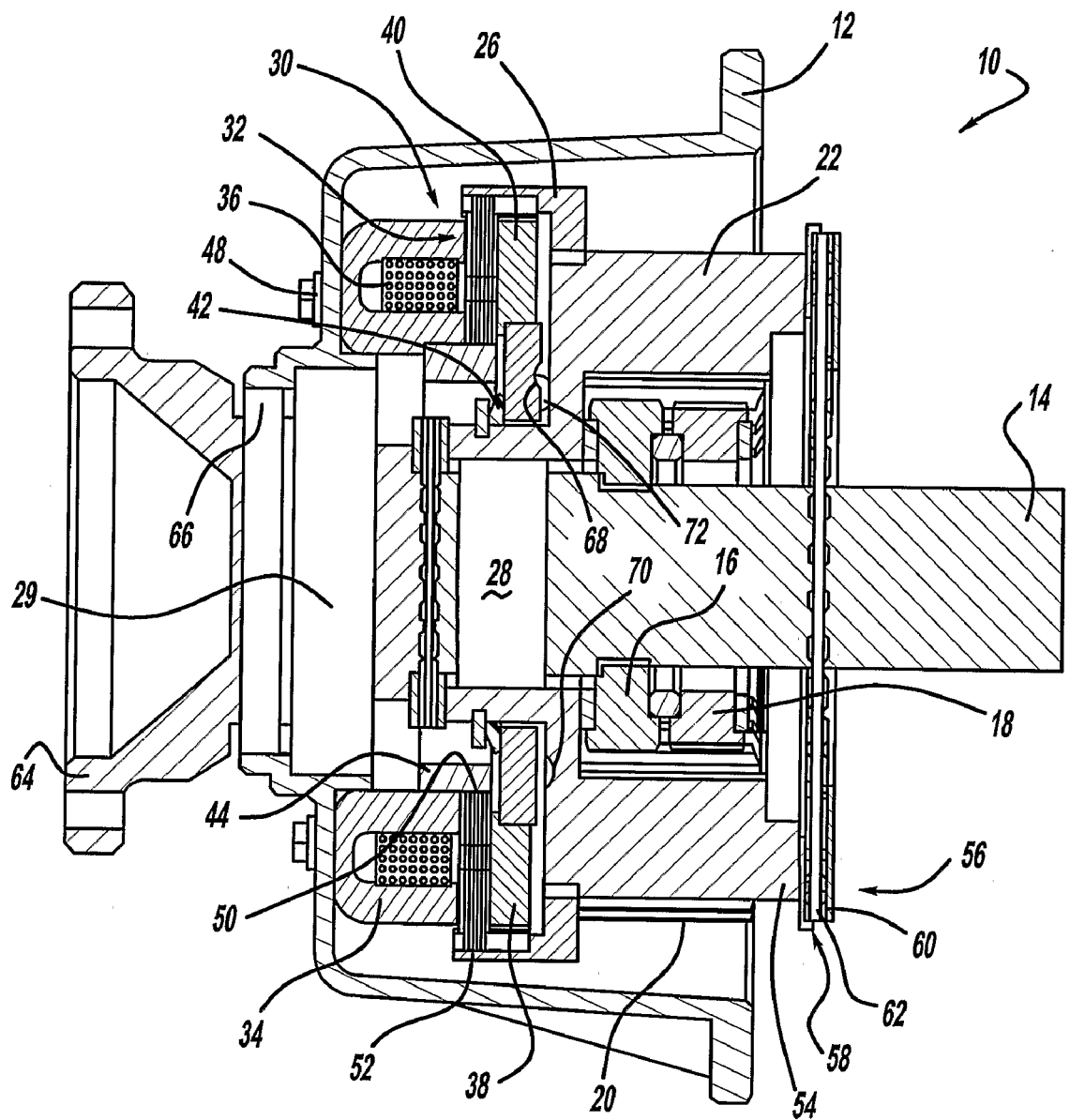
FIG. 3 is a second sectional side view of an electronic control torque vectoring axle, according to the present invention.

Referring to FIGS. 1-3, there is an input shaft 14 which is connected to the pinion gears (not shown) of the differential 11 on a first end, and splined to an output gear 16. Splined to the differential housing is a drive gear 18. Both the drive gear 18 and the output gear 16 are in mesh with planetary gears 20. The output gear 16 has a first tooth profile, and the drive gear 18 has a second tooth profile. The planetary gears 20 have a single tooth profile which is in mesh with both the first tooth profile of the output gear 16, and the second tooth profile of the drive gear 18. The planetary gears 20 are mounted onto carrier 22 through the use of needle bearings 24 and pins 25. The carrier 22 is securely fastened to carrier ring 26. The carrier ring 26 includes a bearing 28, which is press-fitted into the carrier ring 26, and a deep-groove ball bearing 29, allowing the carrier ring 26 to rotate freely about input shaft 14.

The present invention also includes an electromagnetic coil assembly 30, used for actuating a clutch pack 32. The electromagnetic coil assembly 30 is also comprised of a coil holder 34, a magnetic coil 36, an armature 38, a cam apply plate 40, a return spring 42, and hub 44. The coil holder 34 is secured to the housing 12 through the use of screws 48, and the hub 44 is splined to the coil holder 34. The clutch pack 32 is comprised of inner diameter splined clutch plates 50 and outer diameter splined clutch plates 52. The inner diameter splined clutch plates 50 are splined to the hub 44, and the outer diameter splined clutch plates are splined to the carrier ring 26. The inner diameter splined clutch plates 50 and the outer diameter splined clutch plates 52 are comprised of non-paper material to allow for a common type of lubricant to be used in the differential and the eTVA.

Further supporting the carrier 22 is carrier support ring 54, which also supports needle roller assembly 56. Needle roller assembly 56 is comprised of inner needle thrust washer 58, outer needle thrust washer 60, and needle bearing 62.

Input shaft 14 extends through the entire eTVA 10, and has a flange 64 used for connecting the input shaft 14 to a vehicle axle. Lubricant is held inside the eTVA 10 though the use of shaft seal ring 66.

In operation, an eTVA 10 is coupled to each side of a differential in a motor vehicle, and each eTVA 10 works with a rear axle of the vehicle. Power is transferred to the input shaft 14 from the differential. When the magnetic coil 36 is not actuated, the clutch pack 32 will not be engaged and the drive gear 18 will be rotating at the same speed as the output gear 16 because the differential housing, which is connected to the drive gear 18, and the input shaft 14 are rotating at the same speed. When clutch pack 32 is not engaged, the eTVA 10 acts as a typical open differential, and power is only transferred from the input shaft 14 to the vehicle's rear axle.

The clutch pack 32 can be engaged as follows: the magnetic coil 36 is actuated, generating a magnetic field, which causes the armature 38 to slide toward the magnetic coil 36. As this occurs, the clutch pack 32 is applied, causing there to be a difference in speed between the armature 38 and cam apply plate 40 in relation to the carrier ring 26.

The cam apply plate 40 has a series of ball ramps 68 which are aligned with a series of ball ramps 70 located in the carrier ring 26. Located in the ball ramps 68 and the ball ramps 70 are balls 72.

The differential speed between cam apply plate 40 and the carrier ring 26 causes the balls 72 to roll inside the series of ball ramps 68 and 70. The ball 72 then forces the cam apply plate 40 and the carrier ring 26 to separate even further, increasing the force applied to the clutch pack 32. As the force applied to the clutch pack 32 increases, the speed of the carrier 22 decreases. When the magnetic coil 36 is not actuated, the drive gear 18 will be rotating at the same speed as the output gear 16 because the differential housing connector to the drive gear 18 and the input shaft 14 are rotating at the same speed. When the magnetic coil 36 is actuated, the differential housing will continue to rotate at the same speed, but the speed of the carrier 22 will decrease. This will cause the planetary gears 20 to rotate faster, causing the output gear 16, and therefore the input shaft 14, to rotate faster. This increase in speed of the input shaft 14 will also increase the speed of the rear axle (not shown) connected to the input shaft 14, and therefore the speed of the rear wheel of a vehicle. This increase in speed can compensate for the difference in turning radii between the rear wheels of a vehicle when the vehicle is traveling around a turn, and can also compensate for wheel slip during driving conditions when the surface the vehicle is traveling on has become slippery, improving the overall function of a differential.

Once the magnetic coil 36 is de-activated, the return spring 42 drives the cam apply plate 40 away from the clutch pack 32, allowing the clutch pack 32 to release and the balls 72 to return to a rest position.

Because the input shaft 14 is coupled to the differential pinion gears, and the input gears 18 are coupled to the differential housing, the eTVA 10 located on the opposite side of the differential will react if the clutch pack 32 is applied. Applying the clutch pack 32 will cause the input shaft 14 on the same side of the differential as the clutch pack 32 to increase speed, while decreasing the speed of the input shaft 14 on the opposite side of the differential by the same amount. If the carrier 22 were stopped from rotating completely, the input shaft 14 would rotate at twice the speed as the input shaft 14 on the opposite side of the differential.

Figure 4:
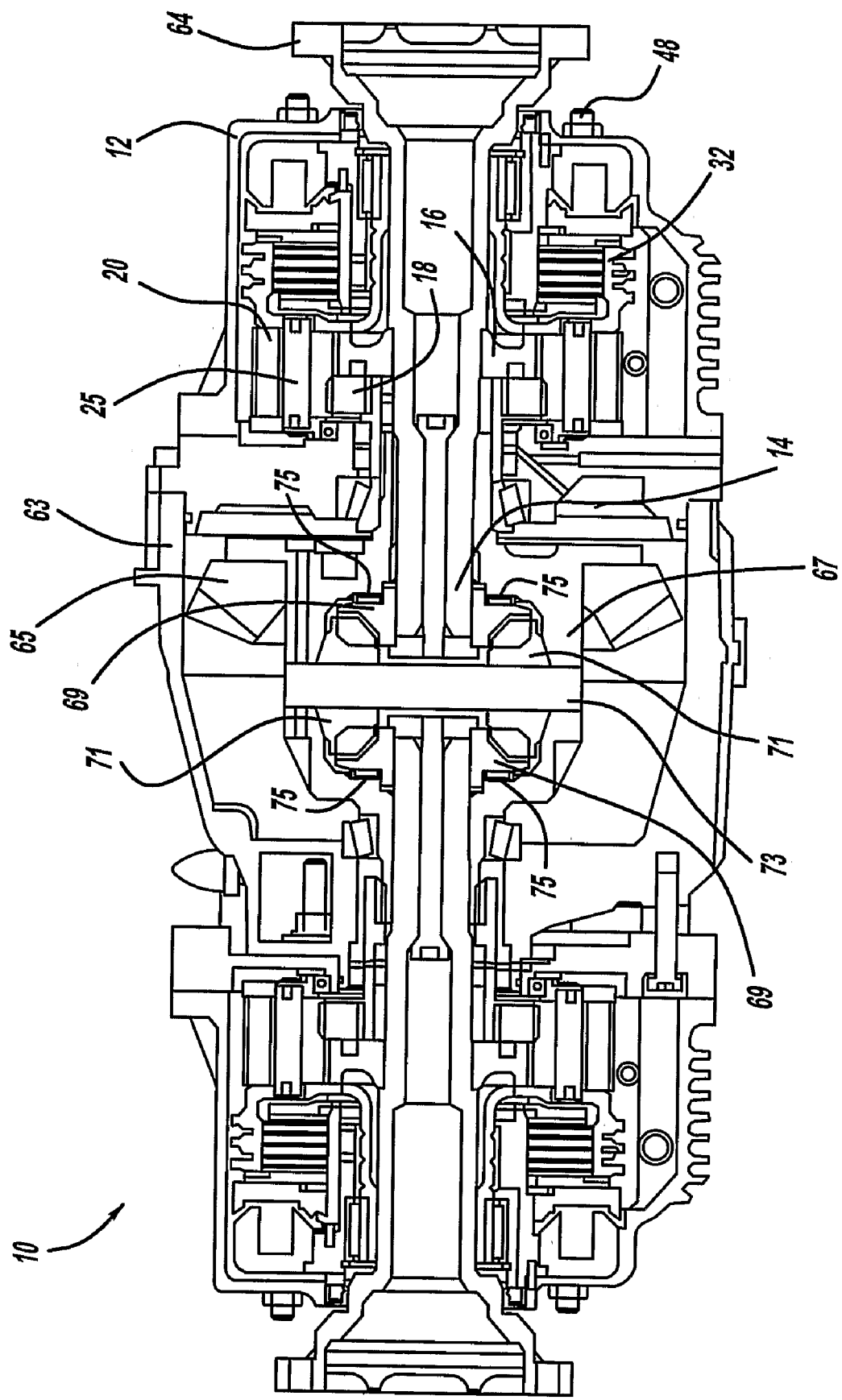
FIG. 4 is a sectional view of a rear differential incorporating a an electronic control torque vectoring axle according to a second embodiment of the present invention.
Figure 5:
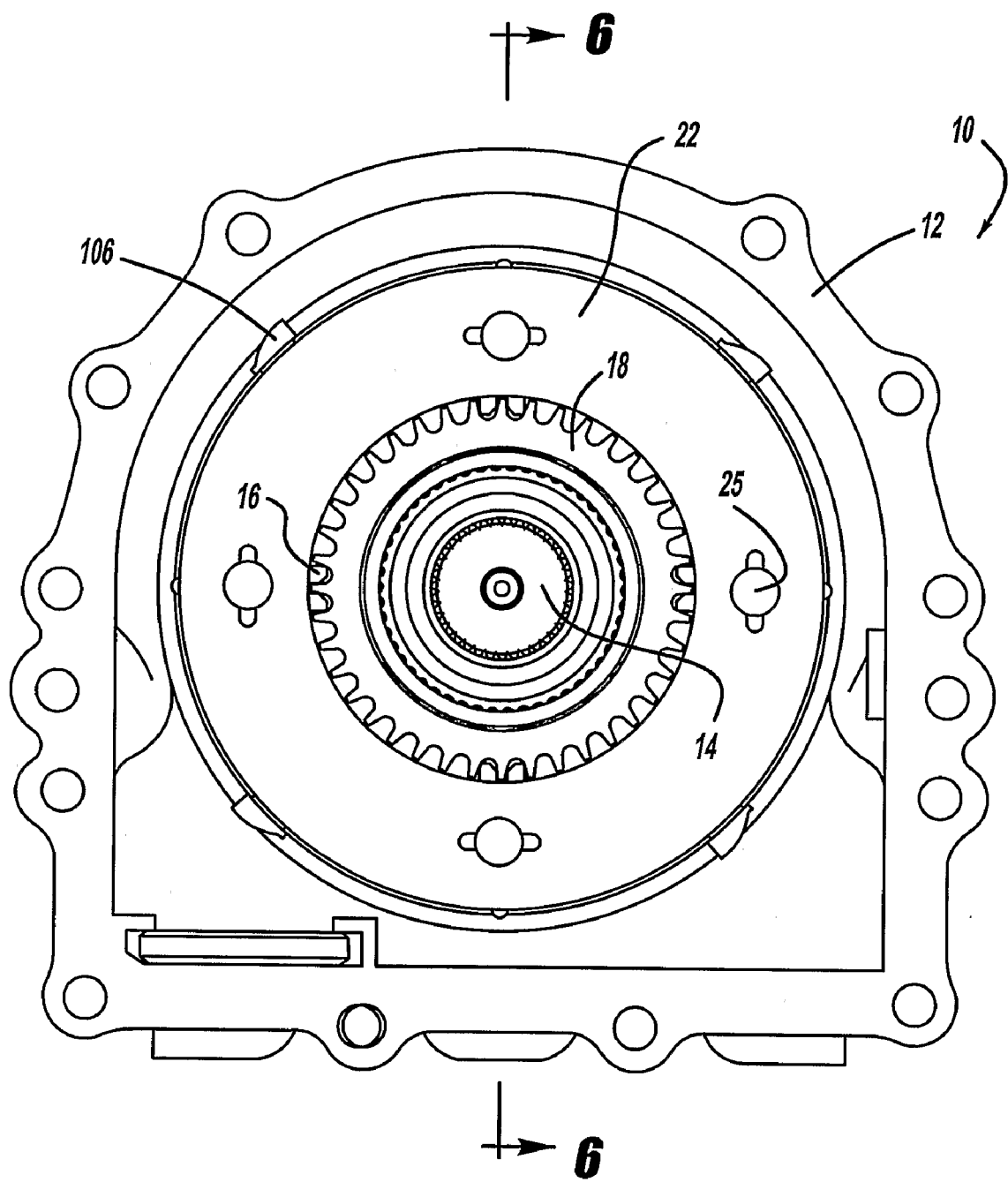
FIG. 5 is a front view of an electronic control torque vectoring axle, according to a second embodiment of the present invention.
Figure 6:
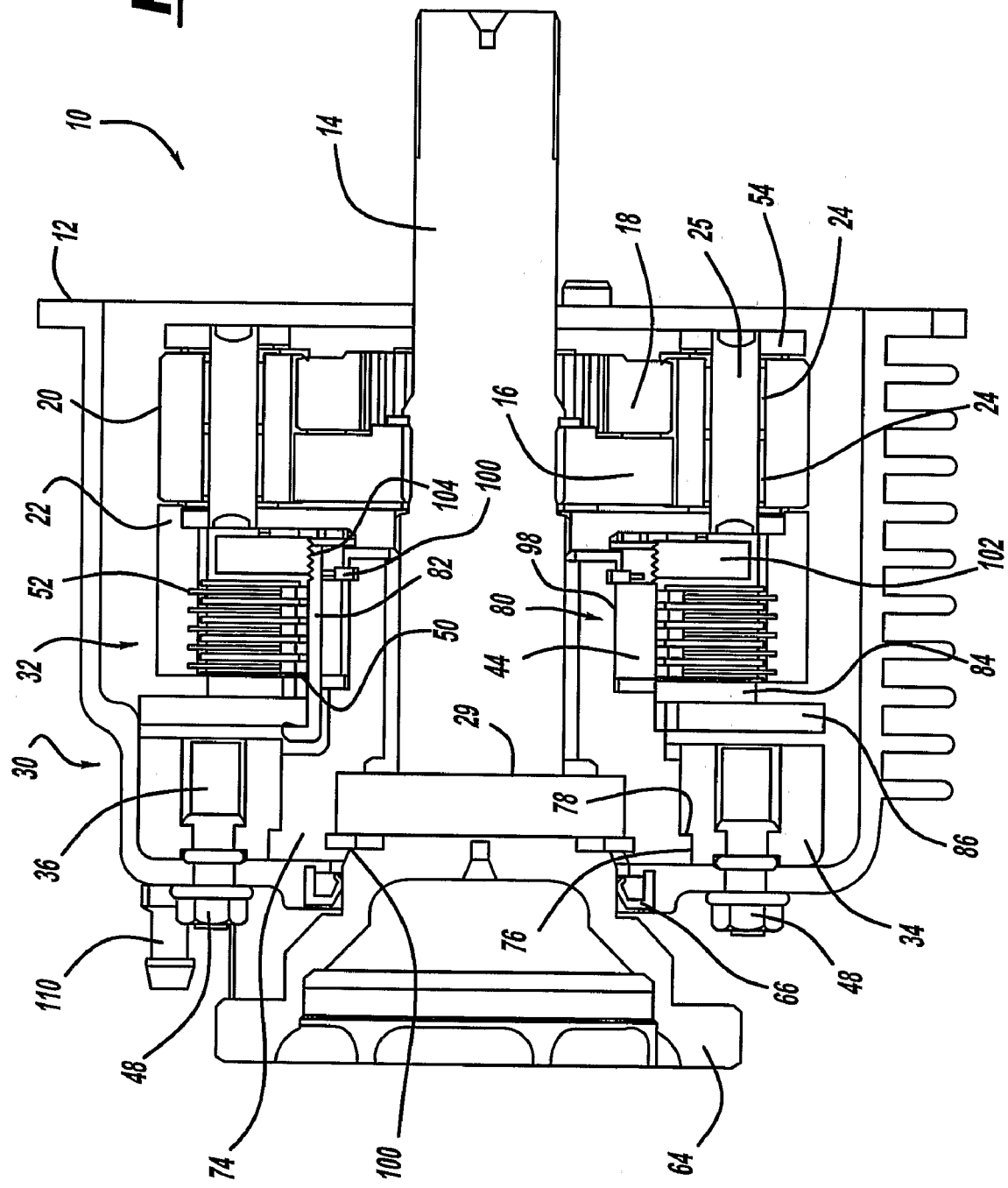
FIG. 6 is a sectional side view of an electronic control torque vectoring axle, taken along line 6-6 of FIG. 5, according to a second embodiment of the present invention.
Figure 7:
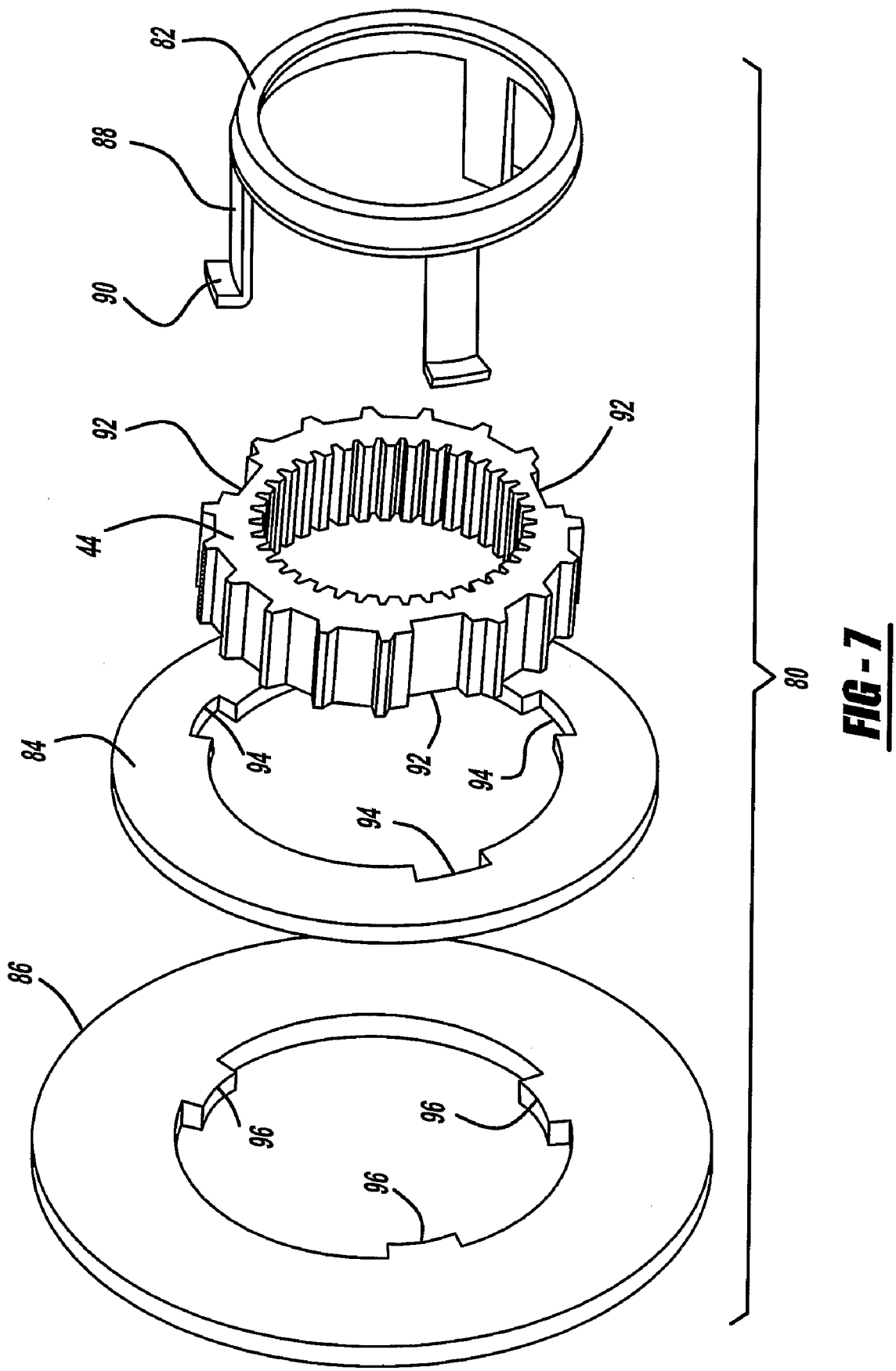
FIG. 7 is an exploded view of a smart armature hub assembly according to a second embodiment of the present invention.
Figure 8:
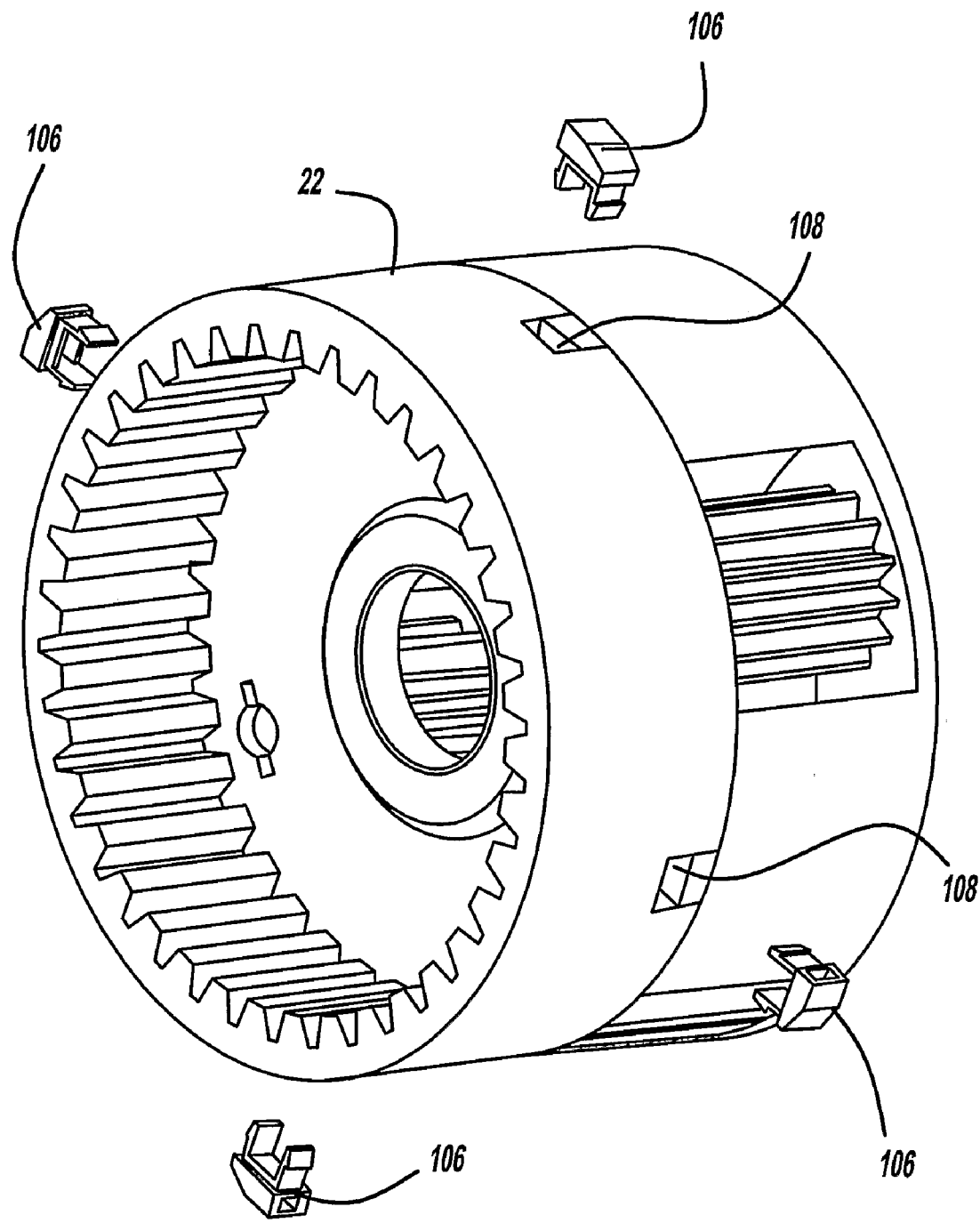
FIG. 8 is an exploded view of a carrier having scoops for providing lubrication, according to a second embodiment of the present invention.

Another embodiment of the present invention is shown in FIG. 4, wherein like numbers refer to like elements. An example of the second embodiment of the present invention being incorporated onto both sides of a differential 63 is shown in FIG. 4. The power transfer described with this embodiment is similar to the first embodiment with the differences between the two embodiments to be discussed below. Power is transferred from a common drive shaft having a bevel gear (not shown) to a ring gear 65 fixed to a differential housing 67. The differential housing 67 also has a first set of pinion gears 69 splined to each input shaft 14, and a second set of pinion gears 71 in mesh with the first set of pinion gears 69. The second set of pinion gears 71 rotate on a pin 73 which also extends through the differential housing 67. The differential housing 67 is splined to the drive gear 18, and the first set of pinion gears 69 are splined to the input shaft 14. To aid in reducing frictional losses, the first set of pinion gears 69 also include a set of thrust bearings 75 which are located between the first set of pinion gears 69 and the differential housing 67. These thrust bearings 75 significantly reduce the amount of friction between the second set of pinion gears 69 and the differential housing 67 when the pinion gears 69 are rotating relative to the differential housing 67.

Referring to FIGS. 4-8, this embodiment includes a grounding hub 74 having a ridge 76 which rests in a shoulder 78 in the coil holder 34. During assembly, the grounding hub 76 is pressed into the coil holder 34, and held in place once the coil holder 34 is attached to the housing 12 with the screws 48. Also included in the second embodiment is a smart armature hub assembly 80 having a slider 82, a spacer 84, and a reaction plate 86. The slider 82 has extensions 88 with tabs 90 for holding the smart armature hub assembly 80 together. The hub 44 in this embodiment includes gaps 92 for allowing the extensions 88 of the slider 82 to slide over the gaps 92 of the clutch hub 44, and through a set of recesses 94 on the spacer 84. The extensions 88 are then inserted through the reaction plate 86 such that the slider 82 can then be rotated to align the tabs 90 on the extensions 88 with a set of tabs 96 on the reaction plate 86.

Once the smart armature hub assembly 80 is assembled, the smart armature hub assembly 80 is slid onto the grounding hub 74 and is held in place with a spline connection 98 between the smart armature hub assembly 80 and the grounding hub 74, and a clip 100. The clutch pack 32 is then placed onto the clutch hub 44 in a similar manner as the first embodiment. The clutch pack 32 is held in place with a retaining plate 102, which is screwed onto the slider 82 by way of a threaded connection 104. The threaded connection 104 allows the pack clearance of the clutch pack 32 to be adjusted with relative ease. The retaining plate 102 can be rotated to adjust the pack clearance, in this embodiment, the pack clearance is approximately 1.5 mm. Once the pack clearance is set, the threaded connection 104 is staked to prevent the retaining plate 102 from backing away from the clutch pack 32 and changing the pack clearance.

This embodiment also includes a carrier 22 for supporting the planetary gears 20 having a carrier ring 26 which is splined to the outer diameter splined clutch plates 52, and a carrier support ring 56. However, the carrier 22 in this embodiment also includes scoops 106. The scoops 106 are inserted into a set of apertures 108 in the carrier 22 and are held in place by a common snap fit connection. In this embodiment, the eTVA 10 has a separate fluid sump than the rest of the differential. As the carrier 22 rotates, the scoops 106 will scoop up oil and properly lubricate the clutch pack

32. In order to ensure proper lubrication, the scoops 106 must face the direction of rotation of the carrier 22. Also, since the eTVA 10 is sealed from the differential, the housing also includes a breather 110 which allows the fluid and air inside the housing 12 to expand and contract without building pressure inside the housing 12.

Having a separate sump in the housing 12 allows for various types of fluids to be used. Typically, if the housing 12 uses the same fluid as the rest of the differential 63, the types of fluids which can be used are limited to common gear lubes because the gears in the differential require the use of gear lube. This in turn limits the type of friction material which can be used on the inner diameter splined clutch plates 50 and the outer diameter splined clutch plates 52. If the housing 12 is sealed off from the rest of the differential, as is the case with the second embodiment of the present invention, other types of fluids can be used, increasing the number of friction materials which could be used on the inner diameter splined clutch plates 50 and the outer diameter splined clutch plates 52.

Typical friction plates used in a differential include friction material that is capable of being used in gear lube, which is very abrasive and can destroy friction materials which are paper-based. These friction materials are commonly made with non-paper based materials such as graphite or carbon fiber. While these materials are able to withstand being used in gear lube, and have high heat resistance, they usually have low friction coefficients. Having the housing 12 sealed from the rest of the differential allows for paper-based friction material to be used, which has higher frictional coefficients, and can increase performance.

When the second embodiment is in operation, the magnetic coil 36 is actuated in a similar manner to the first embodiment. This attracts the reaction plate 86 and draws the reaction plate 86 toward the magnetic coil 36. This in turn slides the slider 82 on the clutch hub 44, and forces the retaining plate 102 to apply force to clutch pack 52, causing the rotational speed of the carrier 22 to decrease. Decreasing the speed of the carrier 22 will increase the speed of the planetary gears 20, and thereby increase the speed of the input shaft 14.

When the magnetic coil 36 is not actuated, the drive gear 18 will be rotating at the same speed as the output gear 16 because the differential housing 65 connected to the drive gear 18 and the input shaft 14 are rotating at the same speed. When the magnetic coil 36 is actuated, the differential housing 65 will continue to rotate at the same speed, but the speed of the carrier 22 will decrease. This will cause the planetary gears 20 to rotate faster, causing the output gear 16, and therefore the input shaft 14 to rotate faster. Allowing the eTVA 10 to improve the overall function of a differential.

It should also be noted that, like the first embodiment, the eTVA 10 of the second embodiment is to be used on both sides of a differential, and when the speed of the input shaft 14 is increased on one side of the differential, the input shaft 14 used on the opposite side will decrease by the same amount.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electronic control torque vectoring axle for a motor vehicle, comprising:
    a housing;
    an input shaft for receiving a driving force, coupled to a differential on a first end, having a flange on a second end, extending through the length of said housing;
    an output gear located inside said housing, said output gear having a first tooth profile and splined to said input shaft;
    a drive gear coupled to a differential housing, said drive gear having a second tooth profile, said second tooth profile different from said first tooth profile;
    at least one planetary gear having a third tooth profile mounted on a carrier, in mesh with said output gear and said drive gear;
    an electromagnetically actuated clutch having a clutch pack, said electromagnetically actuated clutch coupled to said carrier and said housing;
    a slider having at least one extension, said at least one extension having a tab;
    a reaction plate having at least one tab in substantial alignment with said tab of said at least one extension;
    a spacer disposed between said clutch pack and said reaction plate;
    a retaining plate mounted to said slider by a threaded connection such that said clutch pack is disposed between said retaining plate and said spacer; and
    a clutch hub having at least one gap, said at least one extension disposed in said at least one gap, at least a portion of said clutch pack is splined to said clutch hub, and a portion of said clutch pack is splined to said carrier;
    wherein said electromagnetically actuated clutch is actuated, causing said reaction plate to move said slider and said retaining plate to compress said clutch pack, causing said carrier to slow down, and the speeds of said planetary gear and said output gear are increased, increasing the speed of said input shaft, allowing for said electronic control torque vectoring axle to compensate for changes in direction of said motor vehicle.

2. The electronic control torque vectoring axle of claim 1, wherein said housing is operably connected to a gear housing of a differential such that lubricant from the gear housing of the differential is used as lubricant in said overdrive biasing axle.

3. The electronic control torque vectoring axle of claim 1, wherein said housing is sealed from a gear housing of a differential such that lubricant from said gear housing is a separate lubricant from said housing.

4. The electronic control torque vectoring axle of claim 3, wherein said carrier further includes a series of scoops used for transferring fluid to said clutch pack as said carrier rotates.

5. The electronic control torque vectoring axle of claim 1, wherein a ball cam mechanism assists said clutch pack with an additive apply force.

6. The electronic control torque vectoring axle of claim 1, wherein said slider, said spacer, and said reaction plate form a smart armature hub assembly, and said retaining plate mounted to said slider is used to adjust the pack clearance of said clutch pack.

7. A torque vectoring axle for the differential of a motor vehicle, comprising:
    a housing;
    an output gear having a first tooth profile, said output gear splined to an input shaft, said input shaft extending through said housing and connected to a differential on one end;
    a drive gear having a second tooth profile, said drive gear operably associated with a differential housing;
    a carrier having a series of planetary gears, said series of planetary gears having a third tooth profile in mesh with said first tooth profile of said output gear and in mesh with said second tooth profile of said drive gear;

an electromagnetically actuated clutch having a clutch pack, said clutch pack operably associated with said housing and said carrier;

a slider having at least one extension, said at least one extension having a tab;

a reaction plate having at least one tab in substantial alignment with said tab of said at least one extension;

a spacer disposed between said clutch pack and said reaction plate;

a retaining plate mounted to said slider by a threaded connection such that said clutch pack is disposed between said retaining plate and said spacer; and a clutch hub having at least one gap, said at least one extension disposed in said at least one gap, at least a portion of said clutch pack is splined to said clutch hub, and a portion of said clutch pack is splined to said carrier;

wherein said reaction plate moves said slider and said retaining plate to compress said clutch pack when said electromagnetically actuated clutch is actuated, the speed of said carrier is reduced, and the speed of said drive gear is maintained, causing the speed of said series of planetary gears to increase, increasing the speed of said output gear, and therefore said input shaft.

8. The torque vectoring axle of claim 7, wherein said housing is connected to a casing of a differential, allowing the same lubricant to be used with said biasing axle the differential of a motor vehicle.

9. The torque vectoring axle of claim 7, wherein said housing is sealed off from a casing of a differential, allowing different lubricants to be used with said biasing axle and the differential of a motor vehicle.

10. The torque vectoring axle of claim 7, wherein said electromagnetically actuated clutch pack is operably associated with a ball cam mechanism, said ball cam mechanism used for compressing said clutch pack.

11. The torque vectoring axle of claim 7, wherein said slider, said spacer, and said reaction plate form a smart armature hub assembly, and said retaining plate is rotated relative to said slider for adjusting the pack clearance of said clutch pack.

12. The torque vectoring axle of claim 7, wherein said carrier further includes at least one scoop for delivering fluid to said clutch pack.

13. A method for vectoring torque in the rear differential of a motor vehicle, comprising the steps of:

providing a housing;

providing an input shaft extending through said housing connected to a differential housing on one end, and an axle on another end;

providing an output gear having a first tooth profile, said output gear splined to said input shaft;

providing a drive gear having a second tooth profile, said drive gear operably associated with the differential housing of a differential;

providing a carrier having a series of planetary gears having a third tooth profile in mesh with said first tooth profile of said output gear, and in mesh with said second tooth profile of said drive gear;

providing an electromagnetically actuated clutch having a smart armature hub assembly and a clutch pack, said clutch pack operably associated with said carrier and said housing;

providing a slider as part of said smart armature hub assembly, said slider having at least one extension, said at least one extension having a tab;

providing a reaction plate as part of said smart armature hub assembly, said reaction plate having at least one tab in substantial alignment with said tab of said at least one extension;

providing a spacer as part of said smart armature hub assembly, said spacer disposed between said clutch pack and said reaction plate;

providing a retaining plate mounted to said slider by a threaded connection such that said clutch pack is disposed between said retaining plate and said spacer; and providing a clutch hub having at least one gap, said at least one extension disposed in said at least one gap, at least a portion of said clutch pack is splined to said clutch hub, and a portion of said clutch pack is splined to said carrier;

driving said drive gear with said differential housing;

driving said series of planetary gears and said carrier with said drive gear;

driving said output gear and said input shaft with said series of planetary gears;

decreasing the speed of said carrier by activating said electromagnetically actuated clutch to move said reaction plate, said slider, and said retaining plate to compress said clutch pack between said retaining plate and said spacer;

maintaining the speed of said drive gear, and increasing the speed of said series of planetary gears as the speed of said carrier is decreased;

increasing the speed of said output gear and said input shaft as the speed of said series of planetary gears is increased, allowing said drive gear, said carrier, said output gear and said input shaft to bias the rear differential of a motor vehicle.

14. The method of claim 13, further comprising the steps of:

providing a ball cam mechanism operably associated with said electromagnetic clutch assembly; and compressing said clutch pack with said ball cam mechanism.

15. The method of claim 13, further comprising the steps of:

adjusting the pack clearance of said clutch pack with said retaining plate.

16. The method of claim 13, further comprising the steps of:

sealing said housing from said rear differential;

providing a separate lubricant in said housing for lubricating said clutch pack, and a lubricant in said rear differential.

17. The method of claim 13, further comprising the steps of:

operably connecting said housing to said rear differential such that the same lubricant can be used in said housing and said rear differential.

18. The method of claim 13, further comprising the steps of:

providing at least one scoop; and delivering fluid to said clutch pack with said at least one scoop.

19. The method of claim 13, further comprising the steps of:

providing a differential having a differential housing splined to said drive gear;

providing a ring gear affixed to said differential housing;

providing a first set of pinion gears splined to said input shaft, located in said differential housing;

providing a second set of pinion gears in mesh with said first set of pinion gears, said second set of pinion gears rotatable on a pin extending through said differential housing;

providing a set of thrust bearings positioned between said first set of pinion gears and said differential housing;

rotating said differential housing with said ring gear;

rotating said drive gear with said differential housing; and reducing the friction between said first set of pinion gears and said differential housing with said set of thrust bearings.

* * * * *